Patented Sept. 15, 1942

2,295,566

UNITED STATES PATENT OFFICE 2,295,566

DIAZINE DERIVATIVES

Gaetano F. D'Alelio and James W. Underwood, Pittsfield, Mass., assignors to General Electric Company, a corporation of New York No Drawing. Application September 27, 1941, Serial No. 412,693

13 Claims. (Cl. 260—251)

This invention relates to new chemical compounds and more particularly to diazine derivatives. The invention especially is concerned with the production of new and useful guanazo diazines.

The diazine derivatives of this invention may be represented graphically by the following general formula:

I 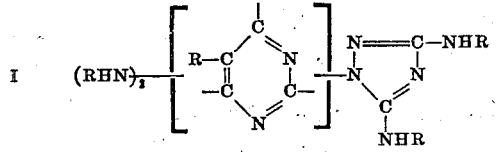

In the above formula R represents a member of the class consisting of hydrogen and monovalent hydrocarbon and halo-hydrocarbon radicals, numerous illustrative examples of which are: aliphatic (e. g., methyl, ethyl, propyl, isopropyl, allyl, butyl, secondary butyl, isobutyl, butenyl, amyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, allylphenyl, isopropylphenyl, 2-butenylphenyl, tertiary-butylphenyl, etc.); aryl-substituted aliphatic (e. g., benzyl, phenylethyl, phenylpropyl, cinnamyl, phenylisopropyl, etc.); and their homologues, as well as those groups with one or more of their hydrogen atoms substituted by, for example, a halogen. Specific examples of halogeno-substituted hydrocarbon radicals are chlorphenyl, chlorcyclohexyl, chlorethyl, dichlorphenyl, ethylchlorphenyl, phenylchlorethyl, brompropyl, bromtolyl, etc. Preferably R in formula I is hydrogen. However, there also may be produced in accordance with the present invention chemical compounds corresponding to the general formula:

II 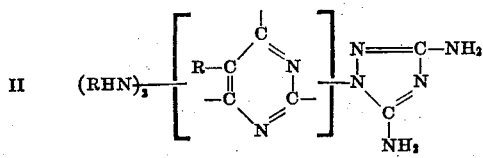

where R is a member of the class consisting of hydrogen and monovalent hydrocarbon and halo-hydrocarbon radicals.

The new diazine derivatives of this invention may be used as intermediates in the preparation of derivatives thereof such as ureido derivatives and semicarbazido derivatives, etc., of the individual guanazo diazine. The chemical compounds of this invention are especially valuable in the preparation of synthetic resinous compositions, since they combine in one compound the advantages of the guanazoles and the diazines. Thus, they may be condensed with, for instance, aldehydes, including polymeric aldehydes and aldehyde-addition products, to yield condensation products of particular utility in the plastics and coating arts. Such condensation products are more fully described and are specifically claimed in our copending application Serial No. 412,692, filed concurrently herewith and assigned to the same assignee as the present invention.

Various methods may be employed to produce the chemical compounds of this invention. One suitable method comprises effecting reaction between a mono-hydrazino diamino [(—NHR)₂] diazine and dicyandiamide (cyanoguanidine). This reaction may be represented by the following general equation:

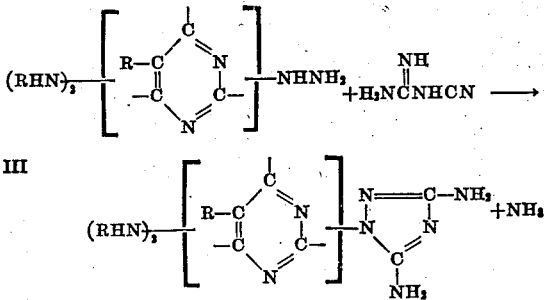

In the above equation R has the same meaning as given above with reference to the general formula I for the diazine derivatives of this invention. This reaction advantageously may be carried out in an aqueous medium and preferably in the presence of one mol of inorganic acid (e. g., hydrochloric, hydrobromic, sulfuric, etc.) for each mol of hydrazino diazine. The acid may be present in the form of an inorganic acid mono salt of the hydrazino diazine.

In place of the dicyandiamide in the above reaction, biguanide (guanylguanidine) may be used. In this case it is preferable either to use two mols of inorganic acid for each mol of hydrazino diamino diazine or to use the inorganic acid mono salt of both the biguanide and the hydrazino diazine, since two mols of ammonia will be liberated. This reaction may be represented by the following general equation:

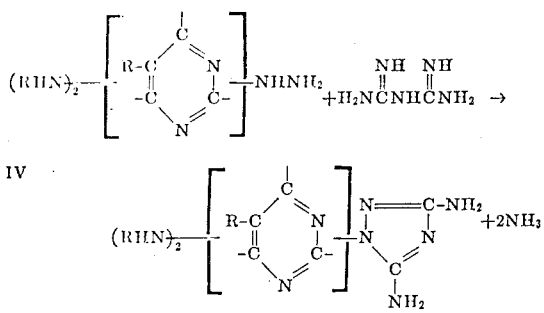

IV

With reference to general Equations III and IV above, it will be noticed that both preparations of the novel compounds of the invention involve the reaction of a mono-hydrazino diamino diazine and a substituted guanidine selected from the class consisting of cyanoguanidine and guanylguanidine. For the preparation of guanazo diazines in which the substituent groups attached to the carbon atoms of the guanazo radical are —NHR groups as shown in general Formula I, where R is a monovalent hydrocarbon or halo-hydrocarbon radical, several methods may be used. One suitable method involves the reaction of substituted cyanoguanidines (e. g., N-phenyl N'-cyano guanidine, N-(meta-tolyl) N'-cyano guanidine, N-(para-tolyl) N'-cyano guanidine, etc.) or substituted guanylguanidines (e. g., N-phenyl N'-guanyl guanidine, N-ethyl N'-phenyl N''-guanyl guanidine, N-phenyl N'-phenyl N''-guanyl guanidine, N-phenyl N'-phenyl (N-phenylguanyl) guanidine, N,N-diethyl guanyl guanidine, etc.) with the hydrazino diazine. Another method involves the amminolysis of the —NH2 groups attached to the carbon atoms of the guanazo radical with primary amines (e. g., methyl amine, ethyl amine, propyl amine, isopropyl amine, aniline, toluidine, cyclohexyl amine, etc.) so that the —NH2 groups are replaced by —NHR groups where R is a hydrocarbon radical corresponding to the hydrocarbon radical of the primary amine.

Illustrative examples of hydrazino diamino 1,3-diazines that may be used, depending upon the particular product sought, are listed below:

2-hydrazino 4,6-diamino 1,3-diazine
4-hydrazino 2,6-diamino 1,3-diazine (6-hydrazino 2,4-diamino 1,3-diazine)
4-hydrazino 2,6-di-ethylamino) 1,3-diazine
4-hydrazino 2,6-dianilino 1,3-diazine
4-hydrazino 2-methylamino 6-anilino 1,3-diazine
4-hydrazino 2-cyclohexylamino 6-toluido 1,3-diazine
2-hydrazino 4,6-di-(chlorphenylamino) 1,3-diazine
4-hydrazino 2-butylamino 5-phenyl 6-propylamino 1,3-diazine
4-hydrazino 2-naphthylamino 5-ethyl 6-benzylamino 1,3-diazine
4-hydrazino 2,6-diamino 5-cyclohexyl 1,3-diazine
4-hydrazino 2,6-diamino 5-tolyl 1,3-diazine
4-hydrazino 2,6-diamino 5-benzyl 1,3-diazine In order that those skilled in the art better may understand how the present invention may be carried into effect, the following illustrative examples thereof are given. All parts are by weight.

EXAMPLE 1

*Preparation of 4-guanazo 2,6-diamino 1,3-diazine*

| | Parts |
|---|---|
| 4-hydrazino 2,6-diamino 1,3-diazine monohydrochloride | 176.5 |
| Dicyandiamide | 84.0 |
| Water | 1000.0 |

The above ingredients were heated together under reflux at the boiling temperature of the mass for 6 hours. After cooling to room temperature, 40 parts of sodium hydroxide in 400 parts water were added to the reaction mass to convert the ammonium chloride to sodium chloride and ammonium hydroxide. The precipitated 4-guanazo 2,6-diamino 1,3-diazine was filtered off, washed free of soluble salts and dried. The following equation represents the reaction:

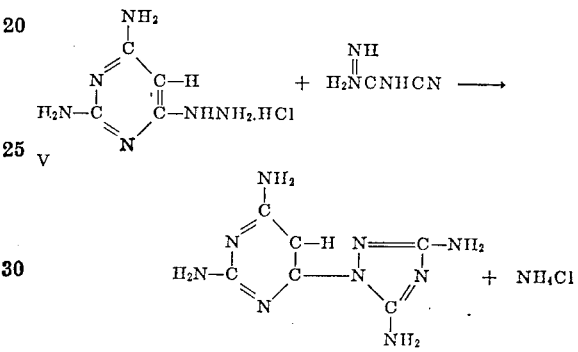

V

EXAMPLE 2

Same as Example 1 with the exception that 137.5 parts of biguanide hydrochloride (guanylguanidine monohydrochloride) are used in place of 84 parts dicyandiamide. In this case two mols ammonium chloride are obtained as a by-product of the reaction for each mol of 4-guanazo 2,6-diamino 1,3-diazine.

2-guanazo 4,6-diamino 1,3-diazine is prepared as described under Examples 1 and 2 with reference to the production of 4-guanazo 2,6-diamino 1,3-diazine using 2-hydrazino 4,6-diamino 1,3-diazine monohydrochloride as a starting reactant instead of 4-hydrazino 2,6-diamino 1,3-diazine monohydrochloride.

In the same way as above described for the preparation of a monoguanazo diamino diazine, diguanazo monoamino triazines and triguanazo triazines may be produced by using the appropriate hydrazino diazine and dicyandiamide or biguanide in the proper molar amounts.

Specific examples of the new compounds of this invention are shown below:

VI

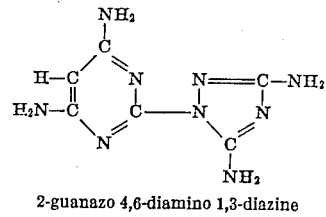

2-guanazo 4,6-diamino 1,3-diazine

VII

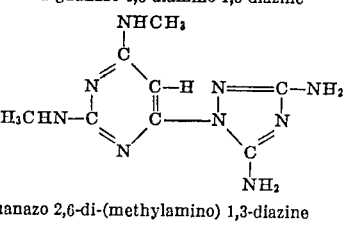

4-guanazo 2,6-di-(methylamino) 1,3-diazine

VIII 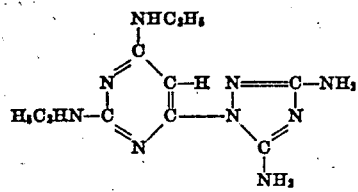
4-guanazo 2,6-di-(ethylamino) 1,3-diazine

IX 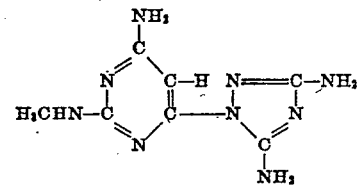
4-guanazo 2-methylamino 6-amino 1,3-diazine

X 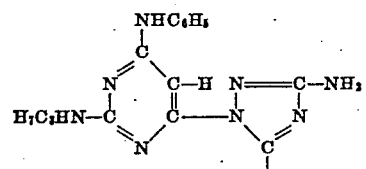
4-guanazo 2-propylamino 6-anilino 1,3-diazine

XI 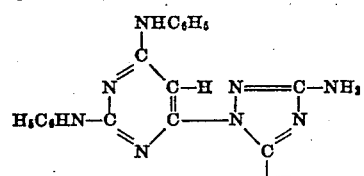
4-guanazo 2,6-di-(anilino) 1,3-diazine

XII 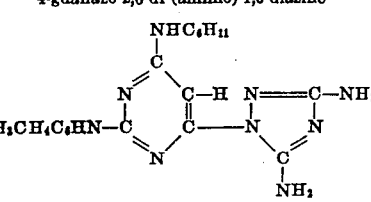
4-guanazo 2-toluido 6-cyclohexylamino 1,3-diazine

XIII 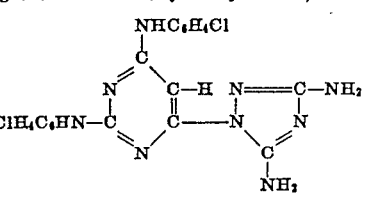
4-guanazo 2,6-di-(chloranilino) 1,3-diazine

XIV 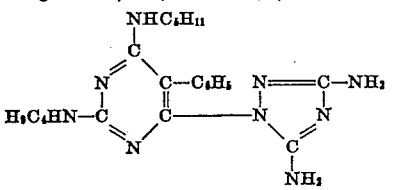
4-guanazo 2-butylamino 5-phenyl 6-pentylamino 1,3-diazine

XV 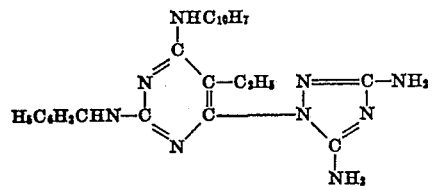
4-guanazo 2-benzylamino 5-ethyl 6-naphthylamino 1,3-diazine

XVI 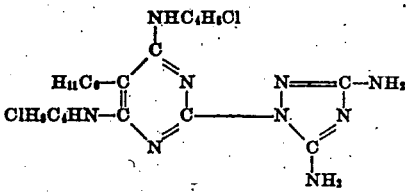
2-guanazo 4,6-di-(chlorbutylamino) 5-cyclohexyl 1,3-diazine

XVII 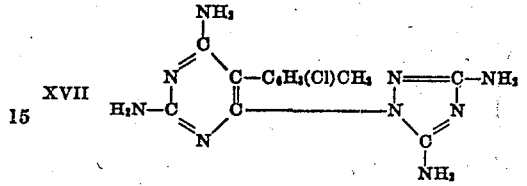
4-guanazo 2,6-diamino 5-chlortolyl 1,3-diazine

XVIII 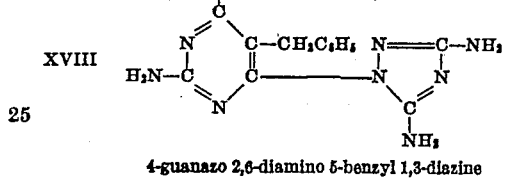
4-guanazo 2,6-diamino 5-benzyl 1,3-diazine

In a manner similar to that described above with particular reference to the production of guanazo 1,3- or meta-diazines (guanazo pyrimidines), the corresponding guanazo 1,2- or orthodiazines (guanazo pyridazines) and the guanazo 1,4- or paradiazines (guanazo pyrazines) may be prepared.

What we claim as new and desire to secure by Letters Patent of the United States is:

1. Chemical compounds corresponding to the general formula

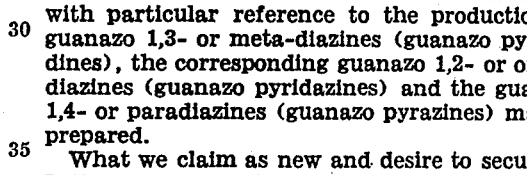

where R is a member of the class consisting of hydrogen and monovalent hydrocarbon and halo-hydrocarbon radicals.

2. Chemical compounds corresponding to the general formula

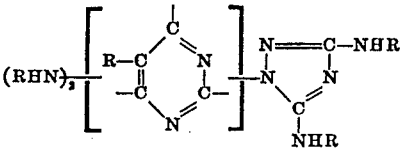

where R is a member of the class consisting of hydrogen and monovalent hydrocarbon and halo-hydrocarbon radicals.

3. Chemical compounds as in claim 2 wherein R represents hydrogen.

4. 2-guanazo 4,6-diamino 1,3-diazine.

5. 4-guanazo 2,6-diamino 1,3-diazine.

6. The method of preparing chemical compounds corresponding to the general formula

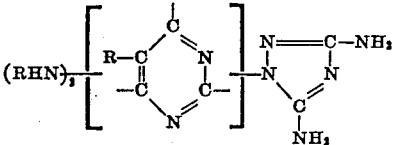

where R represents a member of the class consisting of hydrogen and monovalent hydrocarbon and halo-hydrocarbon radicals, said method comprising effecting reaction between (1) a compound corresponding to the general formula

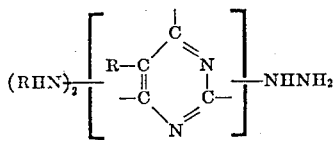

where R has the meaning above given, and (2) a substituted guanidine selected from the class consisting of cyanoguanidine and guanylguanidine.

7. A method as in claim 6 wherein R represents hydrogen and the reaction is carried out in the presence of an inorganic acid.

8. A method as in claim 6 wherein R represents hydrogen and the hydrazino diamino diazine is used in the form of an inorganic acid mono salt thereof.

9. The method of preparing 4-guanazo 2,6-diamino 1,3-diazine which comprises effecting reaction between equimolecular proportions of an inorganic acid mono salt of 4-hydrazino 2,6-diamino 1,3-diazine and a substituted guanidine selected from the class consisting of cyanoguanidine and guanylguanidine.

10. The method of preparing 4-guanazo 2,6-diamino 1,3-diazine which comprises effecting reaction between equimolecular proportions of an inorganic acid mono salt of 4-hydrazino 2,6-diamino 1,3-diazine and cyanoguanidine.

11. A method as in claim 10 wherein the inorganic acid mono salt is the monohydrochloride of 4-hydrazino 2,6-diamino 1,3-diazine.

12. The method of preparing 4-guanazo 2,6-diamino 1,3-diazine which comprises effecting reaction between equimolecular proportions of an inorganic acid mono salt of 4-hydrazino 2,6-diamino 1,3-diazine and an inorganic acid mono salt of guanylguanidine.

13. A method as in claim 12 wherein both inorganic acid mono salts are the monohydrochlorides.

GAETANO F. D'ALELIO.
JAMES W. UNDERWOOD.

Certificate of Correction

Patent No. 2,295,566. September 15, 1942.

GAETANO F. D'ALELIO ET AL.

It is hereby certified that errors appear in the printed specification of the above numbered patent requiring correction as follows: Page 2, first column, line 56, for "2,6-di-ethylamino)" read *2,6-di-(ethylamino)*; and second column, lines 20 to 25, Formula V, for

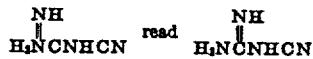

lines 28 to 30, same formula, for that portion reading

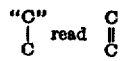

and that the said Letters Patent should be read with these corrections therein that the same may conform to the record of the case in the Patent Office.

Signed and sealed this 10th day of November, A. D. 1942.

[SEAL]

HENRY VAN ARSDALE,
*Acting Commissioner of Patents.*